United States Patent Office 2,793,213
Patented May 21, 1957

2,793,213

PROCESS FOR PREPARING PYRIDINE CARBOXYLIC ACIDS

Max B. Mueller, Dumont, N. J., assignor to Allied Chemical & Dye Corporation, New York, N. Y., a corporation of New York No Drawing. Application July 23, 1954,
Serial No. 445,465

9 Claims. (Cl. 260—295)

This invention relates to a process for the oxidation to pyridine carboxylic acids of heterocyclic aromatic nitrogen compounds containing a single pyridine nucleus and having at least one oxidizable hydrocarbon group attached to the pyridine nucleus by at least one carbon-to-carbon linkage.

Pyridine carboxylic acids are useful as intermediates in various organic reactions, and in the pharmaceutical field. Of these acids, 3-pyridine carboxylic acid, i. e. nicotinic acid (Niacin), is a member of the vitamin B complex group, and is useful in the enrichment of foods to improve their nutritional values, 4-pyridine carboxylic acid, i. e. isonicotinic acid is useful as an intermediate in the preparation of therapeutic compounds, for example, isonicotinic acid hydrazide, etc.

Substituted pyridine and quinoline type compounds of the character described have been oxidized in the past to pyridine carboxylic acids by a number of methods, including oxidation with sulfuric acid at high temperatures in the presence of a catalyst. Such oxidations, using sulfuric acid as the sole oxidizing agent, are usually carried out at temperatures between about 305° C. and about 325° C. and even at these temperatures and with catalytic aid require considerable time for completion of the oxidation reaction, usually from about 6 to about 24 hours.

In such oxidations, halogens such as chlorine have been used as catalyst in amounts between about .5 and 25% by weight based on the N-heteroaryl compound. Other catalysts used are selenium and selenium compounds, either alone or in conjunction with halogens. Such uses resulted in some hastening in reaction rate, the improvement effected by the use of such catalysts bringing the conversion from substantially zero in any reasonable length of time in the absence of a catalyst to completion in reasonable lengths of time ranging from about 6 to about 24 hours when such catalysts were employed.

Efforts to provide processes which could be carried out in shorter times and/or at lower temperatures have resulted in the use of nitric acid or perchloric acid as oxidizing agents in sulfuric acid medium, with or without catalysts.

I have now found that pyridine carboxylic acids may be prepared in good yields at low temperatures, according to my invention, in reaction times as short as from ½ hour to 2 hours, wherein heterocyclic nitrogen compounds containing a single pyridine nucleus and having at least one oxidizable hydrocarbon group attached to the pyridine nucleus by at least one carbon-to-carbon linkage, are oxidized in the presence of a selenium-containing catalyst in the liquid phase to pyridine carboxylic acids by the combined oxidizing actions of concentrated sulfuric acid and gaseous chlorine when the latter is used in quantities of at least about 200% by weight of the heterocyclic nitrogen compound.

As examples of heterocyclic nitrogen compounds susceptible to oxidation by the process of the present invention, there may be mentioned quinoline, isoquinoline, the picolines or methyl pyridines, such as 2-picoline, 3-picoline and 4-picoline, the lutidines or dimethyl pyridines, the collidines such as γ-collidine or trimethyl pyridine and aldehyde collidine or 2-methyl-5-ethyl pyridine, as well as the methyl quinolines, methyl isoquinolines, 5- and 8-nitroquinolines, 5- and 8-hydroxy quinolines, etc.

If the heterocyclic aromatic nitrogen compound of the character described has an oxidizable hydrocarbon substituent attached to the pyridine nucleus in one beta position only, has no unoxidizable substituent group on the pyridine nucleus, and has not more than two additional oxidizable substituents on the pyridine nucleus, each of which is in an alpha position, its oxidation will produce nicotinic acid, either directly, as in the case of 3-picoline, or indirectly by the decarboxylation of all but the single beta carboxylic acid group, as in the case of quinoline and the polyalkyl pyridines having only alpha alkyl groups in addition to the single essential beta substituent.

The advantageous oxidizing effect of chlorine, in quantities above the critical amounts specified, on the sulfuric acid oxidation of heterocyclic nitrogen compounds is exerted in the presence of a catalyst such as a selenium-containing catalyst. Normally, sulfuric acid in the absence of a catalyst produces virtually no conversion of heterocyclic nitrogen compounds to pyridine carboxylic acids even when heated at elevated temperatures in the vicinity of 300° C. for prolonged periods of 10 hours or more. When oxidized by sulfuric acid alone in the presence of a halogen catalyst or a selenium catalyst, or a mixture thereof, complete conversions to pyridine carboxylic acid require periods ranging between about 6 and about 24 hours. Using chlorine in quantities above the critical amounts specified, whereby it exerts a substantial oxidizing action, and carrying out the oxidation at temperatures between about 240° C. and about 325° C. using a catalyst such as a selenium catalyst, the conversion may be hastened to a still greater extent so that completion of the oxidation may be brought about in periods of between about 30 minutes and about two hours, depending on the temperature, rate of chlorine input and the particular heterocyclic nitrogen compound oxidized, and in general in periods of not more than about 60 minutes.

In carrying out the process according to my invention, the heterocyclic aromatic nitrogen base compound dissolved in concentrated sulfuric acid is subjected to the action of critical quantities of chlorine, at elevated temperatures in the presence of a selenium-containing catalyst. In a preferred method, the heterocyclic nitrogen compound is mixed with sufficient concentrated sulfuric acid to provide at least a slight excess thereof over that required to form the nitrogen base sulfate and to maintain such excess during the oxidation reaction. A catalyst such as selenium or a selenium compound is added to the charge, and after bringing the charge to oxidizing temperature, gaseous molecular chlorine is passed into the hot, substantially anhydrous solution. Flow rate of chlorine may be controlled to provide the optimum or desired additional oxidizing action at the particular oxidizing temperature and is continued during the entire oxidation period until the desired conversion of heterocyclic nitrogen compound is attained.

The pyridine carboxylic acid may be recovered from the oxidation masses thus produced in any suitable manner adapted to isolate compounds containing a pyridine carboxylic acid radical from such masses. For example, the acid reaction mixture may be drowned, treated with a copper salt to precipitate copper pyridine carboxylate which may be separated from the reaction mixture, converted by reaction with sodium or ammonium hydroxide to the water soluble sodium or ammonium salt from which the carboxylic acid may be recovered by acidifying to the pH of minimum solubility of the pyridine carboxylic acid, cooling and crystallizing the acid; or other suitable recovery processes may be employed.

Quantities of catalyst, i. e. selenium or selenium compound used may be between about .5% and about 25% by weight based on the weight of the heterocyclic nitrogen compound.

The temperatures at which the combined chlorine-sulfuric acid oxidation of the heterocyclic nitrogen compounds described may be carried out according to my invention, are somewhat lower than the optimum temperatures required for catalytic oxidation of the same heterocyclic nitrogen compound with sulfuric acid as the sole oxidizing agent. Thus, whereas the optimum temperature for oxidizing quinoline to nicotinic acid by sulfuric acid alone in the presence of a selenium catalyst, lies between about 295° C. and about 315° C., and for oxidizing 3-picoline lies between about 305° C. and about 315° C., the optimum temperature when employing sulfuric acid with chlorine in rates above the critical rates specified, in the oxidation of these same compounds lies in the neighborhood of 270° C. Suitable temperature ranges within which substantial oxidizing action is exerted by chlorine are between about 240° C. and about 325° C. Moreover, at about 270° C., the combined use of chlorine and sulfuric acid in the manner described produces upon poly-substituted pyridine ring compounds such as quinoline and isoquinoline, and at about 300° C. upon 2-methyl-5-ethyl pyridine, a "synergistic" oxidizing effect which is greater than the sum of the oxidizing effects attributable to sulfuric acid and chlorine if each were used alone.

The rate at which chlorine may be introduced into the charge may vary; for maximum hastening effect, however, it preferably should be introduced as rapidly as it will be completely absorbed but slowly enough so that little, if any, passes out of the charge. This rate will, of course, vary somewhat with the size of the charge, and it also varies markedly with the stage of the reaction, larger relative proportions of chlorine being generally utilizable in the early stages of the oxidation than near its completion. In general, I find that introduction of chlorine at a rate of at least about 2 parts by weight per minute per 100 parts of N-heteroaryl compound, preferably between about 3 parts and about 8 parts per minute, is satisfactory for the early stages of the oxidation, this rate being decreased somewhat during the later stages when and if chlorine begins to appear in the exit gases. The total quantity used will vary somewhat with temperature and rate of introduction but must be sufficient to insure substantial oxidizing action by the chlorine under the conditions of the oxidation. This quantity will be equal to at least about 200 percent by weight based on the weight of the heterocyclic nitrogen compound, and will usually lie within the range between about 200 percent and about 600 percent.

The oxidation of representative heterocyclic nitrogen bases with sulfuric acid alone theoretically proceeds according to the equations set out below (series A), for quinoline, isoquinoline, the picolines and 2-methyl-5-ethyl pyridine, respectively.

A. THEORETICAL OXIDATION OF NITROGEN BASES WITH SULFURIC ACID

A-1

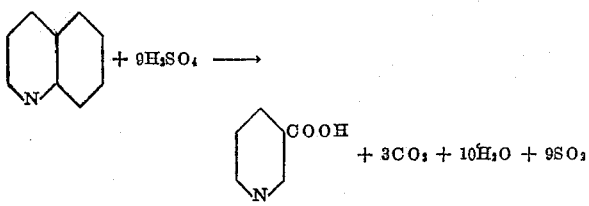

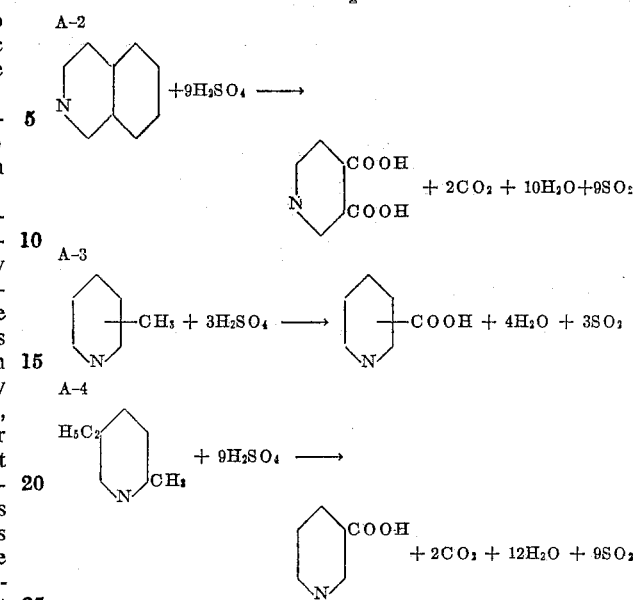

The oxidation of the same representative heterocyclic nitrogen bases would theoretically proceed according to the equations set out below if all the oxidation were attributable to chlorine alone (series B), assuming the presence of water as the source of oxygen.

B. THEORETICAL OXIDATION OF NITROGEN BASES WITH CHLORINE

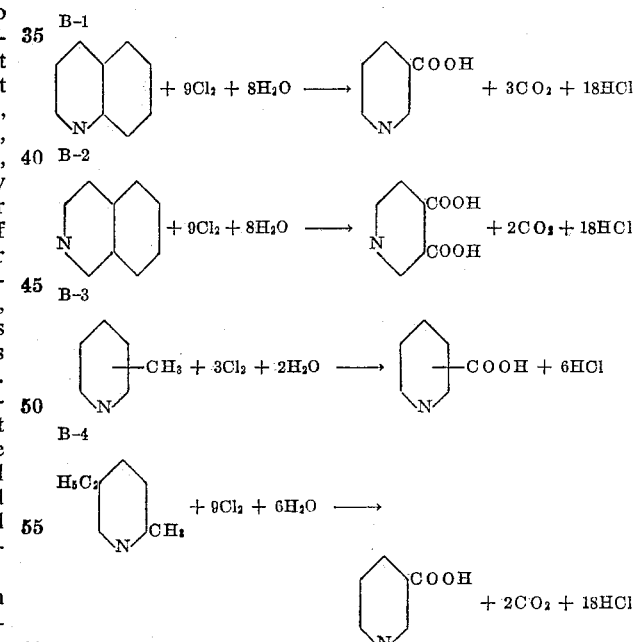

One of the outstanding advantages of the present invention is the increased rate of oxidation of heterocyclic nitrogen compounds to pyridine carboxylic acids over that possible using sulfuric acid as the sole oxidizing agent within the temperature range defined. The amount of this rate increase depends to some extent on the temperature, to some extent appears to be inherent in the compounds oxidized.

The increase in reaction rate induced by chlorine over the rate of reaction using sulfuric acid alone may readily be demonstrated by comparing the conversions obtained by bubbling chlorine through the sulfuric acid reaction mixture, with the result obtained upon bubbling an inert gas such as nitrogen through an identical mixture at the same temperature. Any loss of weight incurred in the mixture through which nitrogen is passed will be attributable to oxidation by sulfuric acid alone, the nitrogen having no chemical effect but reproducing the physical conditions of the chlorine-treated mixture by furnishing similar agitation. The loss of weight is due to loss of $CO_2$, $SO_2$ and water vapor by volatilization as illustrated in the equations. The weight loss occurring in the oxidation mixture through which chlorine is passed, will be due to a combination of sulfuric acid oxidation and chlorine oxidation. A comparison of weight loss versus time in the two types of oxidations is a measure of the rate increase attributable to the chlorine. Whether such weight increase represents a "synergistic" effect may be ascertained by calculating the percent conversion theoretically ascribable to chlorine on the basis of the equations set out above, adding this theoretical conversion to that obtained with $H_2SO_4$ alone under comparable conditions, and comparing this total with the conversion actually obtained by use of the combined sulfuric acid-chlorine oxidizing agent. Positive differences are construed as evidences of synergistic action, negative differences may correspond to incomplete utilization of the chlorine.

The following specific examples further illustrate my invention. In these examples, the figures shown for "percent conversion" are calculated from the total quantity of heterocyclic nitrogen base used up in the reaction, the resulting reaction product being essentially the acid indicated.

*Example 1*

Quinoline was oxidized to nicotinic acid using sulfuric acid as the primary oxidizing agent and chlorine as auxiliary oxidizing agent at about 270° C.

The apparatus used was a 4-neck flask equipped with a gas inlet tube, thermometer, thermocouple well and air condenser. The flask was heated by a quartz hemispherical mantle and temperature was controlled by a thermocouple connected to a potentiometer-controller. The entire apparatus (mantle and flask) was placed on a balance in a manner such that small weight changes in the charge were readily detectable.

In carrying out the run, the flask was charged with 2 parts of selenium as catalyst and with 900 parts of a 5.16% solution of quinoline in 95% sulfuric acid. The charge was brought rapidly to the operating temperature of 270° C. (in 15–30 minutes) where it was maintained. Chlorine gas at room temperature (about 25° C.) was then passed into the hot solution at a rate of 1 liter per minute (2.84 parts by weight per minute). As the oxidation progressed, the weight of the charge decreased due to evolution of gaseous products of oxidation of the quinoline. Weight losses were recorded periodically, and at the same time samples of the charge were analyzed for conversion of quinoline to nicotinic acid and the results recorded. Progress of the oxidation is shown in Table 1A below.

TABLE 1A

[Weight loss and percent conversion of quinoline during oxidation with $H_2SO_4$ at 270° C., supplemented by $Cl_2$, introduced at 1 l./min.]

| Elapsed Time, Hours | Weight Loss, Parts by Weight | Percent Conversion |
| --- | --- | --- |
| ¼ | 40 | 49.8 |
| ½ | 74 | 63.4 |
| 1 | 128 | 81.0 |
| 2 | 181 | 93.2 |
| 3½ | 217 | 88.0 |
| 6 | 260 | 84.2 |

A run made in a manner similar in all respects to the above, except that nitrogen was passed through the charge in place of chlorine, gave the results shown in Table 1B below.

TABLE 1B

[Weight loss and percent conversion of quinoline during oxidation with $H_2SO_4$ at 270° C. with introduction of $N_2$ at 1 l./min.]

| Elapsed Time, Hours | Weight Loss, Parts by Weight | Percent Conversion |
| --- | --- | --- |
| ½ | 28 | 16.8 |
| 2 | 200 | 60.3 |
| 5 | 297 | 77.2 |
| 8 | 342 | 79.1 |
| 12 | 384 | 82.4 |
| 23 | 468 | 82.5 |

In table 1C below the conversion of quinoline by sulfuric acid alone and that theoretically ascribable to chlorine alone under comparable conditions as calculated from the equations in column 4, are listed and are added to give the theoretical total percent conversion ascribable to both sulfuric acid and chlorine. The actual conversion found is also listed, and the difference between theoretical and actual conversion.

TABLE 1C

[Conversion in percent of quinoline during oxidation at 270° C. with $H_2SO_4$ alone and with introduction of $Cl_2$ at 1 l./min.]

| Time, Mins. | $Cl_2$ Alone Theory | $H_2SO_4$ Alone Found | Total $H_2SO_4$ + $Cl_2$ Theory | Actual Total Found | Improvement Over $H_2SO_4$ Alone | Improvement Over Theoretical Total |
| --- | --- | --- | --- | --- | --- | --- |
| 15 | 19 | 7.5 | 26.5 | 49.8 | 42.3 | +23 |
| 30 | 38 | 15. | 53 | 63.4 | 48.4 | +10 |
| 60 | 76 | 30 | 100 | 81 | 51.0 | −19 |

The positive differences between the theoretical conversions and the actual indicate a "synergistic" action in the chlorine under the conditions at which such positive differences occur.

*Example 2*

A run was carried out under the same conditions as those employed in Example 1 above except that weight losses of the reaction mass were recorded at more frequent intervals during the first hour of reaction, and conversion analyses were made at the same intervals, to show more clearly the accelerating effect of the chlorine on the reaction in its early stages. The results are shown in Table 2A below.

TABLE 2A

[Weight loss and percent conversion of quinoline during oxidation with $H_2SO_4$ at 270° C., supplemented by $Cl_2$, introduced at 1 l./min.]

| Elapsed Time, Minutes | Weight Loss, Parts | Percent Conversion |
| --- | --- | --- |
| 10 | 35 | 36.2 |
| 20 | 60 | 51.0 |
| 30 | 87 | 60.9 |
| 45 | 119 | 73.6 |
| 60 | 146 | 83.7 |
| 390 | 317 | 76.5 |

In table 2B below, are shown the calculated figures for theoretical conversion due to chlorine and $H_2SO_4$ as compared to actual conversions found. The positive differences are indicative of synergistic action, the negative differences may be due to incomplete utilization of chlorine under the particular conditions in which they occur.

TABLE 2B

[Percent conversion of quinoline during oxidation at 270° C. with H₂SO₄ alone and with introduction of Cl₂ at 1 l./min.]

| Time, Mins. | Cl₂ Alone Theory | H₂SO₄ Alone Found | Total H₂SO₄ +Cl₂ Theory | Actual Total Found | Improvement Over H₂SO₄ Alone | Improvement Over Theoretical Total |
|---|---|---|---|---|---|---|
| 10 | 13 | 5 | 18 | 36 | 31 | +18 |
| 20 | 26 | 10 | 36 | 51 | 41 | +15 |
| 30 | 38 | 15 | 53 | 61 | 46 | +8 |
| 45 | 57 | 22.5 | 79.5 | 74 | 52.5 | −5.5 |
| 60 | 76 | 30 | 100 | 84 | 50 | −16 |

Example 3

A run was carried out in a manner similar in all respects to that of Example 1, except that the rate of introduction of chlorine was .5 liter per minute (1.3 parts by weight per minute). Weight losses and conversions of quinoline were recorded at the intervals, and with the results listed in Table 3A below.

TABLE 3A

[Weight loss and percent conversion of quinoline during oxidation with H₂SO₄ at 270° C., supplemented by Cl₂, introduced at 0.5 l./min.]

| Elapsed Time, Minutes | Weight Loss, Parts | Percent Conversion |
|---|---|---|
| 15 | 35 | 35.5 |
| 25 | 63 | 46.2 |
| 40 | 95 | 57.3 |
| 70 | 122 | 74.3 |
| 120 | 177 | 86.0 |
| 210 | 215 | 93.8 |
| 390 | 258 | 95.2 |

In a run carried out in a manner similar in all respects with that described above except that nitrogen gas was introduced instead of chlorine, the following results, listed in Table 3B below, were obtained.

TABLE 3B

[Weight loss during oxidation of quinoline with H₂SO₄ at 270° C. with introduction of N₂ at 0.5 l./min.]

| Elapsed Time, Hours | Weight Loss, Parts |
|---|---|
| ¼ | 35 |
| ½ | 65 |
| 1 | 130 |
| 2 | 210 |
| 4½ | 275 |
| 8 | 315 |

In Table 3C below are the calculated figures for theoretical conversion due to chlorine and H₂SO₄ as compared to actual conversions found. The positive differences are indicative of "synergistic" action.

TABLE 3C

[Percent conversion of quinoline during oxidation at 270° C. with H₂SO₄ alone and with introduction of Cl₂ at 0.5 l./min.]

| Time, Mins. | Cl₂ Alone Theory | H₂SO₄ Alone Found | Total H₂SO₄ +Cl₂ Theory | Actual Total Found | Improvement Over H₂SO₄ Alone | Improvement Over Theoretical Total |
|---|---|---|---|---|---|---|
| 15 | 9.5 | 7.5 | 17 | 35.5 | 28.0 | +18.5 |
| 20 | 15.5 | 12.5 | 28 | 46.2 | 33.7 | +18.2 |
| 40 | 25 | 20 | 45 | 57.3 | 37.3 | +12.3 |
| 70 | 43 | 35 | 78 | 74.3 | 39.3 | −3.7 |
| 120 | 74 | 60 | 100 | 86.0 | 26.0 | −14 |

Example 4

A run was carried out in a manner similar in all respects to that used in Example 1, except that a reaction temperature of 300° C. was employed, with the results listed in Table 4A below.

TABLE 4A

[Weight loss and percent conversion of quinoline during oxidation with H₂SO₄, supplemented by Cl₂ introduced at 1 l./min. at 300° C.]

| Elapsed Time, Minutes | Weight Loss, Parts | Percent Conversion |
|---|---|---|
| 5 | 55 | 23.5 |
| 10 | 135 | 42.6 |
| 15 | 230 | 64.0 |
| 20 | 290 | 76.4 |
| 30 | 350 | 90.9 |
| 60 | 390 | 92.0 |

In a run carried out in a manner similar in all respects with that described above except that nitrogen was introduced into the charge in place of chlorine, gave the results shown in Table 4B below.

TABLE 4B

[Weight loss and percent conversion of quinoline during oxidation with H₂SO₄ at 300° C. with introduction of N₂ at 1 l./min.]

| Elapsed Time, Minutes | Weight Loss, Parts | Percent Conversion |
|---|---|---|
| 10 | 100 | 35.3 |
| 20 | 174 | 51.4 |
| 30 | 213 | 58.5 |
| 50 | 242 | 64.4 |
| 270 | 338 | 81.4 |

In Table 4C below are shown the calculated figures for theoretical conversion due to chlorine and H₂SO₄ as compared to actual conversions found.

TABLE 4C

[Percent conversion of quinoline during oxidation at 300° C. with H₂SO₄ alone and with introduction of Cl₂ at 1 l./min.]

| Time, Mins. | Cl₂ Alone Theory | H₂SO₄ Alone Found | Total H₂SO₄ +Cl₂ Theory | Actual Total Found | Improvement Over H₂SO₄ Alone | Improvement Over Theoretical Total |
|---|---|---|---|---|---|---|
| 5 | 6.5 | 17 | 23.5 | 23.5 | 6.5 | 0 |
| 10 | 13 | 35 | 48 | 42.6 | 7.6 | −5 |
| 15 | 19 | 43 | 52 | 64 | 21 | +12 |
| 20 | 26 | 51.5 | 77.5 | 76.4 | 24.9 | −1.1 |
| 30 | 38 | 55.5 | 93.5 | 90.9 | 35.4 | −2.6 |

Example 5

Two runs were carried out in a manner similar in all respects to that described in Example 1 above except that the reaction temperature was 240° C. Weight losses and conversions of quinoline were determined at different intervals in the two runs, in one, at frequent intervals during an hour and a half, in the other, at longer intervals during a 9 hour period. The combined results of the two runs are listed in Table 5A below.

TABLE 5A

[Weight loss and percent conversion of quinoline during oxidation with H₂SO₄, supplemented by Cl₂, introduced at 1 l./min. at 240° C.]

| Elapsed Time | Weight Loss, Parts | Percent Conversion |
|---|---|---|
| 5 min | 8 | 7.5 |
| 10 min | 10 | 11.4 |
| 20 min | 16 | 22.6 |
| 40 min | 32 | 37.8 |
| 1 hr | 55 | 50.7 |
| 1½ hrs | 81 | 62.6 |
| 2½ hrs | 135 | 82.0 |
| 3½ hrs | 160 | 86.3 |
| 6½ hrs | 205 | 94.9 |
| 9 hrs | 235 | 93.8 |

In a run carried out in a manner similar in all respects to that described above except that nitrogen was introduced instead of chlorine, the results listed in Table 5B below, were obtained.

TABLE 5B

[Weight loss and percent conversion of quinoline during oxidation with $H_2SO_4$ at 240° C. with introduction of $N_2$ at 1./min.]

| Elapsed Time, Hours | Weight Loss, Parts | Percent Conversion |
| --- | --- | --- |
| 2 | 45 | 24.7 |
| 5 | 148 | 47.5 |
| 9 | 239 | 66.5 |
| 23 | 390 | 78.5 |

In Table 5C below, are shown the calculated values for theoretical conversion due to chlorine and $H_2SO_4$ as compared to actual conversions found. Comparison of the actual conversion values with those attributable to $H_2SO_4$ alone indicate that under the conditions of this run (240° C.) chlorine acts as a supplementary oxidizing agent in that actual conversions are greater than those for $H_2SO_4$ alone, but that it exerts no "synergistic" action as the actual conversion is less than the theoretical total.

TABLE 5C

[Percent conversion of quinoline during oxidation at 240° C. with $H_2SO_4$ alone and with introduction of $Cl_2$ at 1./min.]

| Time, Mins. | $Cl_2$ Alone Theory | $H_2SO_4$ Alone Found | Total $H_2SO_4$ +$Cl_2$ Theory | Actual Total Found | Improvement Over $H_2SO_4$ Alone | Improvement Over Theoretical Total |
| --- | --- | --- | --- | --- | --- | --- |
| 5 | 6.5 | 1 | 7.5 | 7.5 | 6.5 | 0 |
| 10 | 13 | 2 | 15 | 11.4 | 9.4 | −2.6 |
| 20 | 26 | 4 | 30 | 22.8 | 18.8 | −7.4 |
| 40 | 51 | 8 | 59 | 37.8 | 29.8 | −11.2 |
| 60 | 76 | 12.5 | 88.5 | 50.7 | 38.2 | −37.8 |

Example 6

4-picoline was oxidized to picolinic acid using sulfuric acid as the primary oxidizing agent and chlorine as auxiliary oxidizing agent in a manner similar in all respects to that described for quinoline under Example 1 except that 865 parts of a sulfuric acid-4-picoline charge was used in which the 4-picoline was present in concentration of 9.4%. The results of this run are listed in Table 6A below.

TABLE 6A

[Weight loss and percent conversion of 4-picoline during oxidation with $H_2SO_4$ at 270° C., supplemented by $Cl_2$, introduced at 1 l./min.]

| Elapsed Time, Minutes | Weight Loss, Parts | Percent Conversion |
| --- | --- | --- |
| 10 | 13 | 4.7 |
| 20 | 25 | 12.1 |
| 30 | 32 | 15.8 |
| 45 | 45 | 17.1 |
| 75 | 68 | 31.6 |
| 120 | 100 | 57.7 |
| 180 | 138 | 76.1 |

In a run carried out in a manner similar in all respects to that described above except that nitrogen was introduced instead of chlorine, the results listed in Table 6B below were obtained.

TABLE 6B

[Weight loss and percent conversion of 4-picoline during oxidation with $H_2SO_4$ at 270° C., with introduction of $N_2$ at 1 l./min.]

| Elapsed Time, Hours | Weight Loss, Parts | Percent Conversion |
| --- | --- | --- |
| 1¼ | 82 | 3.3 |
| 2½ | 105 | 5.1 |
| 6 | 205 | 13.6 |
| 12 | 335 | 23.6 |

In Table 6C below, are shown the calculated values for theoretical conversion due to chlorine and $H_2SO_4$ as compared to actual conversions found. The data indicate that the chlorine acts as a supplementary oxidizing agent in the $H_2SO_4$ oxidation of 4-picoline but has no "synergistic" effect.

TABLE 6C

[Percent conversion of 4-picoline during oxidation at 270° C. with $H_2SO_4$ alone and with introduction of $Cl_2$ at 1 l./min.]

| Time, Mins. | $Cl_2$ Alone Theory | $H_2SO_4$ Alone Found | Total $H_2SO_4$ +$Cl_2$ Theory | Actual Total Found | Improvement Over $H_2SO_4$ Alone | Improvement Over Theoretical Total |
| --- | --- | --- | --- | --- | --- | --- |
| 10 | 15 | .5 | 15.5 | 4.7 | 4.2 | −10 |
| 20 | 30 | .75 | 30.8 | 12.1 | 11.35 | −18 |
| 30 | 45 | 1 | 46 | 15.8 | 14.8 | −30.2 |
| 45 | 67.5 | 1.5 | 69 | 17.1 | 15.6 | −51.9 |

Example 7

3-picoline was oxidized to nicotinic acid using sulfuric acid as primary oxidizing agent and chlorine as auxiliary oxidizing agent in a manner similar in all respects to that described for quinoline under Example 1 except that 870 parts of charge were used in which 3-picoline was present in a concentration of 6.5%. The results of this run are listed in Table 7A below.

TABLE 7A

[Weight loss and percent conversion of 3-picoline during oxidation with $H_2SO_4$, supplemented by $Cl_2$, introduced at 1 l./min. at 270° C.]

| Elapsed Time, Hours | Weight Loss, Parts | Percent Conversion |
| --- | --- | --- |
| ¼ | 15 | 3.2 |
| ½ | 25 | 12.3 |
| 1 | 50 | 29.1 |
| 1¾ | 90 | 46.6 |
| 4 | 210 | 90.2 |

In a run carried out in a manner similar in all respects to that described above, except that nitrogen was introduced instead of chlorine, the results listed in Table 7B below, were obtained.

TABLE 7B

[Weight loss and percent conversion of 3-picoline during oxidation with $H_2SO_4$ with introduction of $N_2$ at 1 l./min. at 270° C.]

| Elapsed Time, Hours | Weight Loss, Parts | Percent Conversion |
| --- | --- | --- |
| 1 | 65 | 9.9 |
| 3 | 140 | 10.0 |
| 6½ | 240 | 16.9 |
| 15 | 440 | 37.3 |

In Table 7C below, are shown the calculated values for theoretical conversion due to chlorine and $H_2SO_4$ as compared to actual conversions found. The data indicate that chlorine acts as a supplementary oxidizing agent in the $H_2SO_4$ oxidation of 3-picoline under the conditions of the run.

TABLE 7C

[Percent conversion of 3-picoline during oxidation at 270° C. with $H_2SO_4$ alone and with introduction of $Cl_2$ at 1 l./min.]

| Time, Mins. | $Cl_2$ Alone Theory | $H_2SO_4$ Alone Found | Total $H_2SO_4$ +$Cl_2$ Theory | Actual Total Found | Improvement Over $H_2SO_4$ Alone | Improvement Over Theoretical Total |
| --- | --- | --- | --- | --- | --- | --- |
| 15 | 32.5 | 1 | 33.5 | 3.2 | 2.2 | −30 |
| 30 | 6.5 | 2 | 67 | 12.3 | 10.3 | −55 |

Example 8

Isoquinoline was oxidized to cinchomeronic acid using sulfuric acid as the primary oxidizing agent and chlorine as auxiliary oxidizing agent in a manner similar in all respects to that described for quinoline under Example 1 except for the substitution of isoquinoline for quinoline using 88.0 parts of sulfuric acid-isoquinoline charge, with the results listed in Table 8A below.

TABLE 8A

[Weight loss and percent conversion of isoquinoline during oxidation with H₂SO₄, supplemented by Cl₂, introduced at 1 l./min. at 270° C.]

| Elapsed Time, Minutes | Weight Loss, Parts | Percent Conversion |
|---|---|---|
| 10 | 45 | 40.2 |
| 20 | 90 | 62.5 |
| 30 | 130 | 79.4 |
| 45 | 200 | 94.7 |
| 60 | 215 | 97.8 |
| 120 | 270 | 91.4 |

In a run carried out in a manner similar in all respects to that described above, except that nitrogen was introduced instead of chlorine, the results listed in Table 8B below, were obtained.

TABLE 8B

[Weight loss and percent conversion of isoquinoline during oxidation with H₂SO₄ with introduction of N₂ at 1 l./min. at 270° C.]

| Elapsed Time, Hours | Weight Loss, Parts | Percent Conversion |
|---|---|---|
| ½ | 120 | 35.3 |
| 1 | 270 | 73.6 |
| 2 | 345 | 85.8 |
| 3 | 360 | 87.5 |
| 5 | 380 | 89.9 |

In Table 8C below, are shown calculated values for theoretical conversion due to chlorine and H₂SO₄ as compared to actual conversions found. The data indicate that chlorine acts with synergistic effect in the H₂SO₄ oxidation of isoquinoline.

TABLE 8C

[Percent conversion of isoquinoline during oxidation at 270° C. with H₂SO₄ alone and with introduction of Cl₂ at 1 l./min.]

| Time, Mins. | Cl₂ Alone Theory | H₂SO₄ Alone Found | Total H₂SO₄ +Cl₂ Theory | Actual Total Found | Improvement Over H₂SO₄ Alone | Improvement Over Theoretical Total |
|---|---|---|---|---|---|---|
| 10 | 13 | 12 | 25 | 40.2 | 28.2 | +15.2 |
| 20 | 26 | 24 | 50 | 62.5 | 38.5 | +12.5 |
| 30 | 38 | 36 | 74 | 79.4 | 43.4 | +5.4 |

*Example 9*

2-methyl-5-ethyl-pyridine (aldehyde collidine) was oxidized to nicotinic acid using sulfuric acid as the primary oxidizing agent and chlorine as auxiliary oxidizing agent in a manner similar in all respects to that described for quinoline under Example 1 except that 875 parts of charge was used in which 2-methyl-5-ethyl-pyridine was present in a concentration of 5% and a reaction temperature of 300° C. was employed. The results of this run are listed in Table 9A below.

TABLE 9A

[Weight loss and percent conversion of 2-methyl-5-ethyl-pyridine during oxidation with H₂SO₄, supplemented by Cl₂, introduced at 1 l./min. at 300° C.]

| Elapsed Time, Minutes | Weight Loss, Parts | Percent Conversion |
|---|---|---|
| 5 | 75 | 28.3 |
| 15 | 175 | 62.0 |
| 25 | 255 | 80.5 |
| 45 | 315 | 88.3 |
| 120 | 370 | 96.8 |

In a run carried out in a manner similar in all respects to that described above except that nitrogen was introduced instead of chlorine, the results listed in Table 9B below, were obtained.

TABLE 9B

[Weight loss and percent conversion of 2-methyl-5-ethyl pyridine during oxidation with H₂SO₄ with introduction of N₂ at 1 l./min. at 300° C.]

| Elapsed Time, Minutes | Weight Loss, Parts | Percent Conversion |
|---|---|---|
| 20 | 165 | 47.7 |
| 50 | 240 | 68.2 |
| 75 | 300 | 80.6 |

In Table 9C below, are shown calculated values for theoretical conversion due to chlorine and H₂SO₄ as compared to actual conversions found. The data indicate that chlorine acts with synergistic effect in the combined chlorine-H₂SO₄ oxidation of 2-methyl-5-ethyl pyridine.

TABLE 9C

[Percent conversion of 2-methyl-5-ethyl pyridine during oxidation at 300° C. with H₂SO₄ alone and with introduction of Cl₂ at 1 l./min.]

| Time, Mins. | Cl₂ Alone Theory | H₂SO₄ Alone Found | Total H₂SO₄ +Cl₂ Theory | Actual Total Found | Improvement Over H₂SO₄ Alone | Improvement Over Theoretical Total |
|---|---|---|---|---|---|---|
| 5 | 6 | 11 | 17 | 28.3 | 17.3 | +11.3 |
| 15 | 18 | 36 | 54 | 62.0 | 26 | +8.0 |
| 25 | 30.5 | 51.5 | 82 | 80.5 | 29 | −1.5 |
| 45 | 55 | | | 88.3 | | |

While the above describes the preferred embodiments of my invention, it will be understood that departures may be made therefrom within the scope of the specification and claims.

I claim:

1. A process for preparing pyridine carboxylic acids which comprises introducing into a concentrated sulfuric acid solution of a selenium-containing catalyst and a heterocyclic nitrogen compound containing a single pyridine nucleus and having at least one oxidizable hydrocarbon group attached to the pyridine nucleus by at least one carbon-to-carbon linkage, over a period of not more than about 2 hours, a quantity of gaseous chlorine equal to at least about 200 percent by weight based on the weight of the heterocyclic nitrogen compound, at a temperature between about 240° C. and about 325° C. and at a rate of at least about 2 parts by weight per minute per 100 parts of heterocyclic nitrogen compound, and recovering a compound containing the pyridine carboxylic acid radical.

2. The process of claim 1, wherein the heterocyclic nitrogen compound is isoquinoline.

3. The process of claim 1, wherein the heterocyclic nitrogen compound is 4-picoline.

4. A process for preparing nicotinic acid which comprises introducing into a concentrated sulfuric acid solution of a selenium containing compound and a heterocyclic nitrogen compound containing a single pyridine nucleus and having an oxidizable hydrocarbon group attached to the pyridine nucleus in one beta position only, having no unoxidizable substituent group on the pyridine nucleus and having not more than two additional oxidizable substituents on the pyridine nucleus, each of which is in an alpha position, over a period of not more than about 2 hours, a quantity of gaseous chlorine equal to at least about 200 percent by weight based on the weight of the heterocyclic nitrogen compound, at a temperature between about 240° C. and about 325° C. and at a rate of at least about 2 parts by weight per minute per 100 parts of heterocyclic nitrogen compound, and recovering a compound containing the pyridine carboxylic acid radical.

5. The process of claim 4 wherein the heterocyclic nitrogen compound is quinoline.

6. The process of claim 4 wherein the heterocyclic nitrogen compound is 3-picoline.

7. The process of claim 4 wherein the heterocyclic nitrogen compound is 2-methyl-5-ethyl pyridine.

8. The process of claim 1 wherein the heterocyclic nitrogen compound is selected from the group consisting of quinoline and isoquinoline, and wherein the temperature is about 270° C. whereby a synergistic effect is obtained.

9. The process of claim 4 wherein the heterocyclic nitrogen compound is 2-methyl-5-ethyl pyridine, and wherein the temperature is about 300° C., whereby a synergistic effect is obtained.

References Cited in the file of this patent

UNITED STATES PATENTS

| | | |
|---|---|---|
| 2,449,906 | Mueller | Sept. 21, 1948 |
| 2,476,004 | Teeters | July 12, 1949 |
| 2,505,568 | Mueller | Apr. 25, 1950 |
| 2,515,593 | Engel et al. | July 18, 1950 |
| 2,694,070 | Martin | Nov. 9, 1954 |

OTHER REFERENCES

Stitz: Chem. Abst., vol. 38, page 2040 (1944).